United States Patent [19]
van Namen

[11] Patent Number: 5,231,337
[45] Date of Patent: Jul. 27, 1993

[54] VIBRATORY ACOUSTIC COMPRESSOR

[75] Inventor: Frederik T. van Namen, Danville, Calif.

[73] Assignee: Harman International Industries, Inc., Northridge, Calif.

[21] Appl. No.: 904,210

[22] Filed: Jun. 25, 1992

Related U.S. Application Data

[63] Continuation-in-part of Ser. No. 816,658, Jan. 3, 1992.

[51] Int. Cl.⁵ ............................................. H02K 33/00
[52] U.S. Cl. .................................... 318/128; 310/15
[58] Field of Search ................... 310/14, 15, 23, 30; 318/128

[56] References Cited

U.S. PATENT DOCUMENTS

| | | | |
|---|---|---|---|
| 2,003,647 | 6/1935 | Dillström | 310/14 |
| 2,276,022 | 3/1942 | Cox | 310/30 |
| 3,753,384 | 8/1973 | Anfindsen | 310/14 |

FOREIGN PATENT DOCUMENTS

| | | | |
|---|---|---|---|
| 3824257 | 1/1990 | Fed. Rep. of Germany | 310/14 |
| 0842026 | 7/1960 | United Kingdom | 310/15 |

OTHER PUBLICATIONS

"Electro–Fluidic Valve" by H. Byrnes et al., IBM Technical Disclosure Bulletin, vol. 11 No. 10 Mar. 1969.

*Primary Examiner*—Steven L. Stephan
*Assistant Examiner*—Thomas M. Dougherty
*Attorney, Agent, or Firm*—J. E. McTaggart

[57] ABSTRACT

An acoustic compressor is disclosed for generating a high pressure acoustic waveform within a chamber containing a working medium. The compressor comprises an actuator body solidly mounted to the chamber with a vibrating armature spring-mounted within. The chamber and actuator body are resiliently mounted so as to be vibratable. Owing to reaction forces, vibration of the armature causes vibration of the chamber which generates an acoustic waveform in the medium. By matching the resonant frequency of the armature to the acoustic resonant frequency of the chamber and driving the armature at that frequency, extremely high pressures within the chamber may be obtained.

8 Claims, 4 Drawing Sheets

DIAGRAM: PRESSURE DISTRIBUTION ALONG CHAMBER

FIG. 8

VIBRATORY ACOUSTIC COMPRESSOR

This application is a continuation-in-part of prior application Ser. No. 816,658, filed on Jan. 3, 1992 entitled "Actuator for Active Vibration Control."

BACKGROUND OF THE INVENTION

Recently, there has developed great interest in compressors which lack traditional moving parts. Such compressors are particularly suitable for application in refrigeration systems which use non-ozone depleting refrigerants as the working medium. One type of such compressor is the so-called acoustic compressor whereby a standing acoustic wave is generated in a chamber, containing the working medium. The pressure variations caused by the acoustic wave are then utilized to pump, and therefore compress, the medium. Acoustic compressors are described in detail in U.S. Pat. No. 5,020,977 issued to Lucas, the disclosure of which is hereby incorporated by reference.

In the acoustic compressors described in the aforementioned '977 patent, the acoustic waveform is generated by a flexible diaphragm mounted at one end of the chamber containing the working medium and driven by an electromagnetic actuator. The arrangement is thus similar to a conventional loudspeaker. The frequency at which the diaphragm is driven is chosen in accordance with the physical properties of the working medium and the geometry of the chamber so that a standing wave (i.e., one having stationary nodes and antinodes) is produced within the chamber. That is, the diaphragm is driven at a frequency corresponding to one of the normal modes of the system so that a condition of resonance is achieved within the chamber.

Obviously, it is advantageous in a refrigeration system for the acoustic compressor to generate pressures as high as possible in order to compress the refrigerant. At a given driving frequency, the only way to increase the pressure amplitude of the acoustic waveform is to increase the amplitude of the diaphragm's back and forth excursion. Such an increase is severely constrained, however, by the physical characteristics o both the flexible diaphragm and the electromagnetic actuator which permit only a limited range of motion at a given frequency. Furthermore, a flexible diaphragm can only withstand a limited amount of pressure before it physically fails.

SUMMARY OF THE INVENTION

It is a primary object of the present invention to provide an acoustic compressor capable of generating acoustic waveforms at extremely high pressures. Such a compressor is particularly suitable for incorporation into a refrigeration system where the acoustic waveform produces compression of a refrigerant.

In accordance with the present invention, a chamber containing the working medium is solidly connected to the body of an electromagnetic actuator. Within the actuator is an armature which undergoes vibrational motion in response to the application of an AC driving signal. The armature is mounted within the actuator body by means of armature springs which allow the armature to vibrate within the body. The actuator body and chamber are also mounted so as to be vibratable, either by means of springs or resilient mounting media. Due to conservation of momentum, vibrational motion of the armature causes corresponding vibrational motion of the chamber containing the working medium. Such vibration, if at a resonant frequency determined by the medium and chamber length, produces a standing acoustic waveform within the chamber. The resulting pressure variations may then be used to pump medium into the chamber through an inlet valve and out through an outlet valve.

The amplitude of the pressure waveform thus generated is dependent upon the extent of vibratory displacement undergone by the chamber. The latter can be increased by choosing the armature mass and armature springs so that the armature vibrates at its resonant frequency.

Other objects, features, and advantages of the invention will become evident in light of the following detailed description considered in conjunction with the referenced drawings of a preferred exemplary embodiment according to the present invention.

DETAILED DESCRIPTION OF THE INVENTION

It is well known, of course, that when an oscillating system is driven externally at a resonant frequency of the system, the system undergoes oscillation at a maximum amplitude limited only by the amount of damping (e.g., frictional losses) within the system. Furthermore, at resonance, the system absorbs the maximum amount of energy possible from the external driving source with no reactive power losses due to back and forth energy transfers between the system and the external driver.

Figures 1, 2:
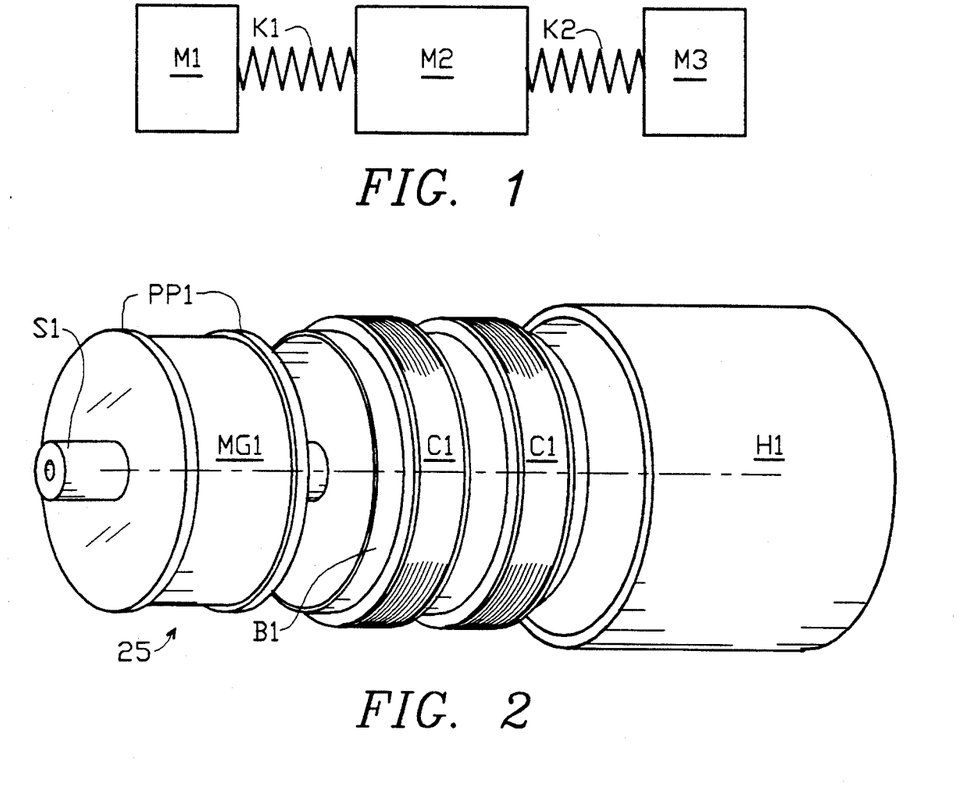
FIG. 1 is a schematic of a three mass oscillating system useful for understanding the present invention.
FIG. 2 shows an exploded view of one embodiment of an electromagnetic actuator.

FIG. 1 is a schematic representation of a simple oscillating system consisting of masses M1, M2, and M3 connected by springs K1 and K2. (The designations also represent the mass and spring constant of each of the masses and springs, respectively.) If the mass M1 is caused to oscillate at a certain frequency by a driving force, masses M2 and M3 will also oscillate owing to the spring connections between the masses. The relative amplitudes of oscillation of the masses depends upon the driving frequency. If M2 is assumed to be very large, the displacement of mass M3 will be greatest when its oscillation is equal to the resonant frequency at which M3 vibrates with respect to M2. That frequency, $F_3$, is given by:

$$F_3 = \sqrt{\frac{K2}{M3}}$$

Displacement of mass M3 is, of course, effected by the displacement of mass M2 which transmits force through spring K2. Maximum oscillatory displacement of M2 due to a force acting on mass M1 occurs when masses M1 and M2 oscillate at their resonate frequency. Again, if mass M2 is assumed very large, that resonant frequency $F_1$ is given by:

$$F_1 = \sqrt{\frac{K1}{M1}}$$

Therefore, if mass M3 and spring constant K3 are assumed fixed, maximum oscillatory displacement of mass M3 occurs when:
1) the frequency of external driving force applied to mass M1 is equal to $$F_3 = \sqrt{\frac{K2}{M3}} \; ;$$

and,
2) mass M1 and spring constant K1 are chosen such that K1/M1=K2/M3.

The above derivation has assumed mass M2 to be very large relative to masses M1 and M3. If such is not the case, the mass M2 must be taken into account. Maximum oscillatory displacement of mass M3 at resonant frequency $$\sqrt{\frac{K2}{M3}}$$

then occurs when the following equation holds:

Parameters M1 and K1 correspond to the mass and spring constant respectively of the armature, M2 corresponds to the mass of the actuator-chamber unit, and M3 and K2 correspond to the dynamic mass and spring constant respectively of the fluid in the chamber. The condition for maximizing the amplitude of the standing wave set up in the fluid, and thus the recurrent fluid pressure variations available for pumping and compressing occurs when the frequency F1 of the drive current is made to be K1/M1 and the other parameters, K2, M2 and M3, are made to satisfy the equation K1/M1=(K2/M3)/(1+M1/M2).

Figure 6:
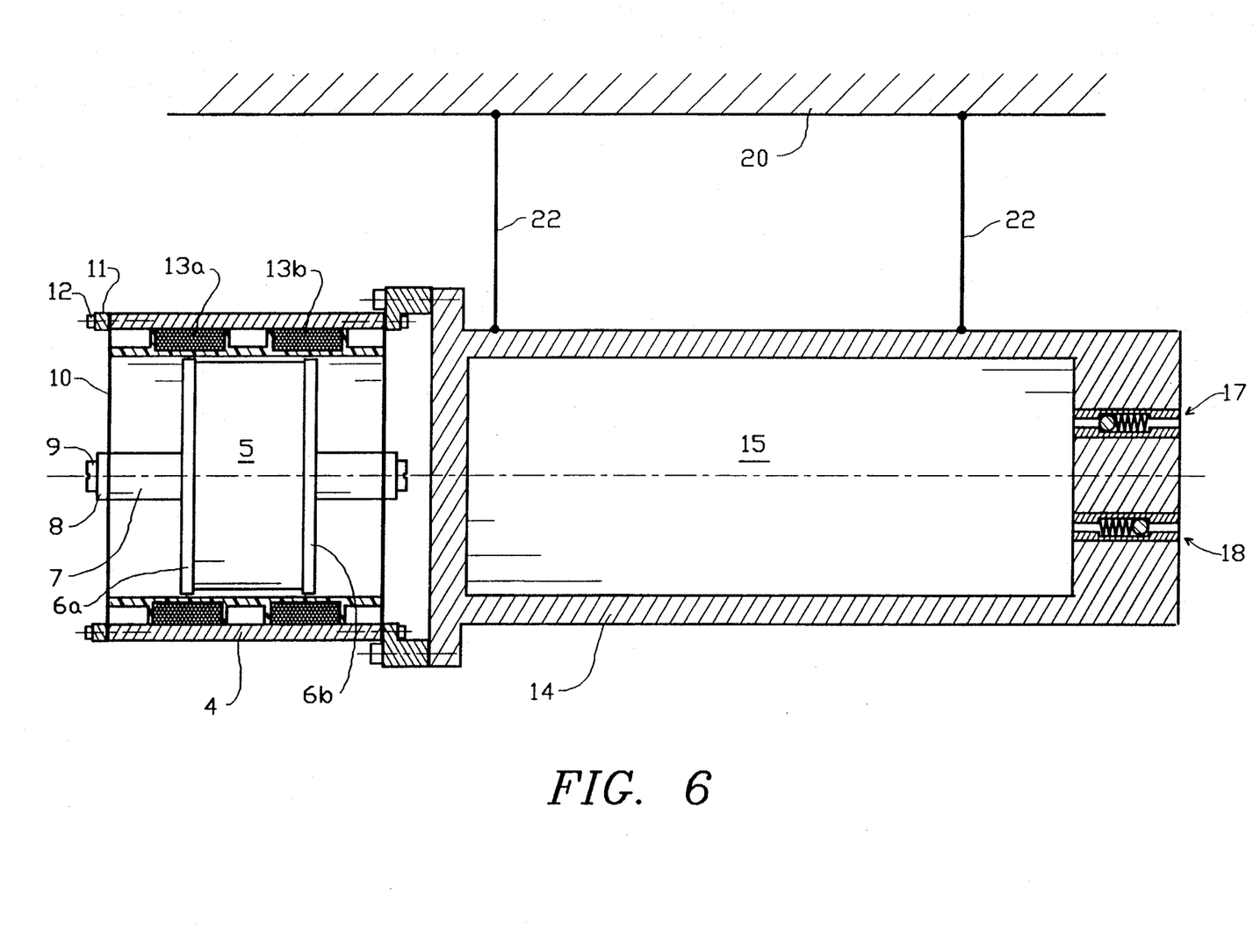
FIG. 6 shows an acoustic compressor in accordance with the present invention.

FIG. 6 shows an embodiment of an acoustic compressor in accordance with the present invention. Chamber 14 encloses the working medium 15 (refrigerant in the case of a refrigeration system). As the medium is alternately compressed and expanded at the end of chamber 14 due to a standing acoustic waveform, the medium is pumped into the chamber through inlet valve 18 and out through outlet valve 17. Both valves 17 and 18 in this embodiment are check valves which allow fluid flow in only one direction. The waveform is generated by an electromagnetic driver or actuator containing a permanent magnet structure or armature mounted within a body or housing by means of springs so as to be vibratable in an axial direction.

Figure 3:
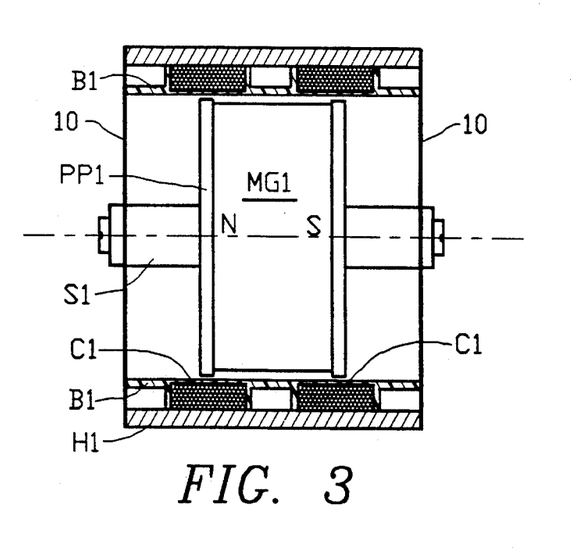
FIG. 3 is a sectional view of the actuator of FIG. 2.
Figure 4:
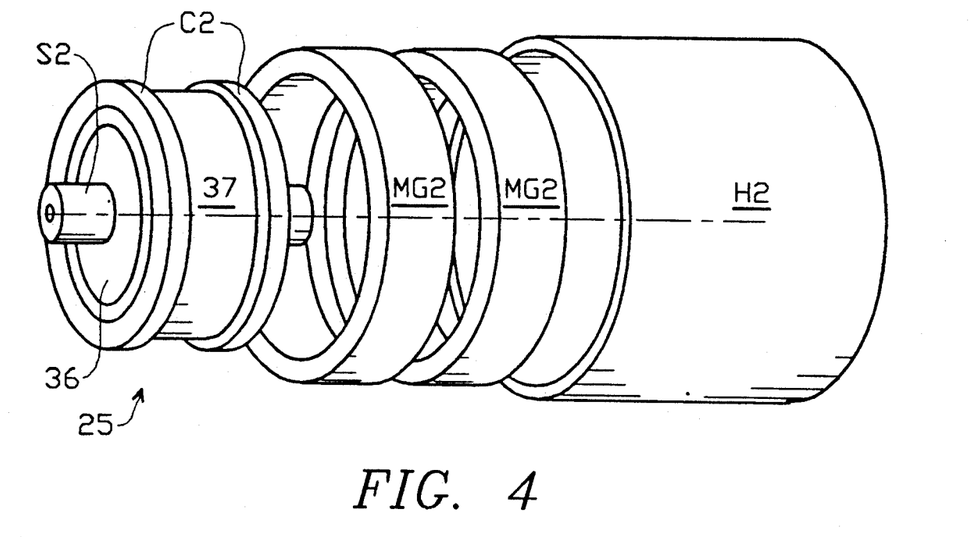
FIG. 4 shows an exploded view of a second embodiment of an electromagnetic actuator.

FIGS. 3 and 4 show an actuator in greater detail. The armature 25 comprises a permanent magnet structure MG1 mounted on an actuator shaft S1 and magnetized in an axial direction. The shaft S1 is mounted at its ends within a magnetically permeable actuator body H1 which is open at both ends along the axis of the shaft S1. The shaft S1 is mounted at each end to a leaf spring 10 attached to the body H1. The magnet MG1 is a magnet stack which contains one or more coaxially positioned permanent magnets and two or more pole plates PP1. A plate PP1 is placed between each magnet and at either end of the magnet stack. In case of more than one magnet, the magnets are stacked on the shaft S1 in such a way that equal magnetic poles face each other. The magnet MG1 in this embodiment is cylindrical with a circular cross-section but could be of any arbitrary shape.

Two or more solenoidal coils C1 are wound on a non magnetic bobbin B1 mounted within the body H1. The coils C1 are spaced from each other in an axial direction so as to form rings on the bobbin B1. The inside diameter fits around the magnet structure MG1 with some minimal diametrical clearance so as to allow it free axial motion. The outside diameter of the bobbin B1 fits snugly inside the cylindrical steel body H1. The coils C1 are electrically connected with each other in such a way that an electrical current flowing through adjacent coils C1 will create opposing magnetic fields. When an AC driving signal is applied to the coils Cl, the armature 25 undergoes reciprocal motion in accordance with the driving signal owing to the forces exerted on the poles of magnet MG1.

Figure 5:
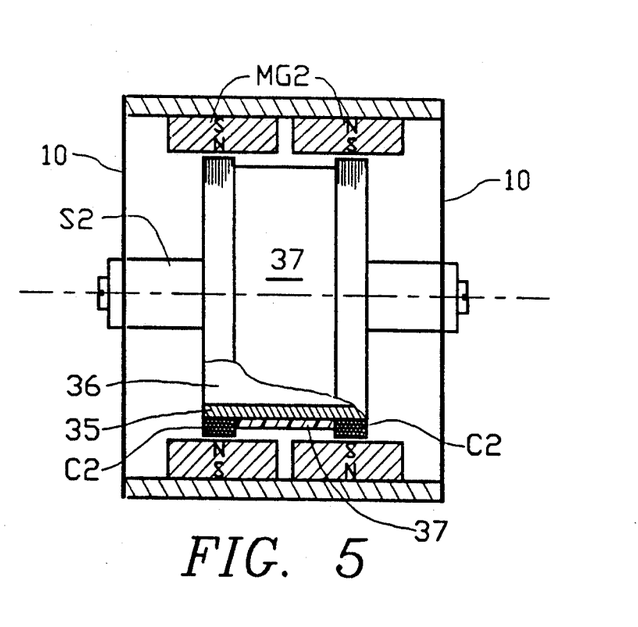
FIG. 5 is a sectional view of actuator of FIG. 4.

Referring next to FIGS. 4 and 5, there is shown another embodiment of an electromagnetic actuator which is of the moving coil type. Two or more annular magnet segments MG2 are attached on the inside of an outer actuator body H2 made of highly magnetically permeable material such as magnetically soft steel. The body H2 is closed at each end with leaf springs 10 similar to the embodiment described earlier. The magnets MG2 are magnetized in a radial direction with adjacent magnets having their N-S poles oriented in opposite directions.

The armature 25 in FIGS. 4 and 5 comprises two or more field coils C2 wound on a thin walled magnetic steel cylinder 35. A non-magnetic core 36 occupies the center of the cylinder 35. The coils C2 are spaced from each other with a non-magnetic material 37. An actuator shaft S2 is mounted in the center of the core 37 and shaft S2 is mounted within the housing H2 to leaf springs 10 attached at each end of the actuator body. The coils C2 are electrically connected so that an AC input current applied to the coils creates opposing magnet fields in each adjacent coil C2 which causes the armature 25 to undergo reciprocal motion in accordance with the input signal. The body H1 and cylinder 35, provide a magnetic flux path for the magnets MG2 which concentrates and directs perpendicularly their fields toward the coils C2.

In either of the embodiments described above, by enclosing the magnets with a material having high magnetic permeability (i.e., body H1 or H2), most of the magnetic flux is guided through the magnetic gap in which the coils C1 or C2 are placed. Only very little flux will leak past this gap, thus creating a highly efficient electromagnetic actuator. In the case of the first embodiment, all the flux in the pole plates PP1 is guided through the coils. In the second embodiment, the cylinder 35 provides a low reluctance pathway for the flux produced by the magnets MG2.

Each of the embodiments of the present invention also provides an actuator which presents a low inductance load to the electrical input signal. Since the change in input current due to a change in the input voltage signal occurs with a time constant proportional to this inductance, reducing this inductance results in a more linear relationship between the input signal and the force applied to the moving element. The inductance is reduced by electrically connecting adjacent coils in series so as to create opposing magnetic fields. An inductive coupling between adjacent coils occurs due to a linkage of magnetic fields created when a current runs through the coils. When the direction of the current in two adjacent coils is the same the resulting magnetic fields are added and the total inductance of the combination is double the inductance of a single coil. When the currents run in opposite directions, the induced magnetic fields oppose each other which reduces the total inductance. Since the electrical time constant is proportional to the total inductance, it follows that the time constant is also thereby reduced. This effective reduction in total inductance is enhanced the better is the flux linkage between the coils. The above-described embodiments achieve a high degree of flux linkage between adjacent coils by providing a low reluctance pathway inside the coils.

The embodiments described above also provide an actuator where the force on the moving armature (i.e., either the coil or the magnet) due to a given input current is independent of the position of the armature along its stroke path. This is achieved in the first embodiment by providing coils C1 adjacent to each pole of the magnets MG1 making up the armature 25. Similarly, in the second embodiment, an annular magnet MG2 is provided adjacent each of the coils C2. By properly manipulating the dimensional relations of the coils and the pole plates the magnetic flux flowing through the coils can be made constant over the length of the moving element's stroke.

Referring again to FIG. 6, chamber 14 is solidly connected to body 4 of the electromagnetic actuator or driver. The cylindrical driver contains a magnetic armature 25 which consists of a magnet 5, two pole pieces 6a-b, two spacers 7, two washers 8 and two screws 9. The armature is concentrically placed in the driver body 4 and supported by two leaf-type springs 10. The springs 10 are clamped to the driver body 4 by means of the clamping rings 11 and the screws 12. Two coils 13a-b are placed between the pole pieces 6 and the driver body 4 leaving a small clearance between the coil and the pole piece. The coils 13 are solidly adhered to the driver body 4. Due to the axial direction of the magnetization of the magnet 5, the pole pieces 6 exhibit opposite magnetic polarity. Hence the magnetic flux from pole piece 6a flows through coil 13a to the soft magnetic driver body 4 through the coil 13b and back to the other pole piece 6b, thus creating opposing magnetic fields in the coils 13. The coils 13 are electrically connected in such a way that the current running in one coil is in opposite direction from the current running in the other coil, thus creating a low inductance coil pair and generating oppositely directed magnetic fields. When an electrical current flows through the coils 13, a force is exerted in the armature in an axial direction and proportional to the amount of current. When an alternating current is applied to the coils 13, the resulting alternating force produces reciprocating motion of the armature.

If the entire compressor shown in FIG. 6 were assumed to be suspended in free space, vibrational motion of the armature as described above would produce similar motion in opposite phase of the body 4 and chamber 14 due to conservation of momentum (i.e., due to the reaction force acting on the coils 13 produced by the magnetic field.) This result can be approximated by resiliently mounting the compressor on springs or a similar structure allowing some freedom of movement. FIG. 6 shows that the compressor is mounted on a frame 20 by means of leaf springs 22 extending from chamber 14 so as to allow some vibrational motion in the axial direction.

Figure 7:
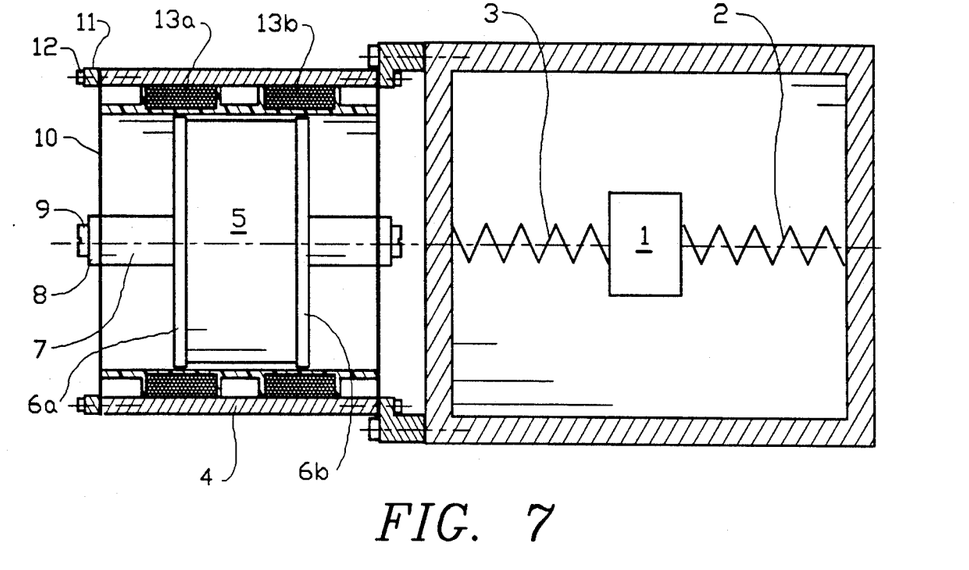
FIG. 7 shows an acoustic compressor where the medium is modeled by a spring-mounted mass within the chamber.

The components shown in FIG. 6 can now be seen to be approximately represented by the oscillating system of FIG. 1. The armature is equivalent to mass M1, leaf springs 10 are equivalent to spring K1, the chamber 14 and remainder of the actuator including the body 4 are equivalent to mass M2 and the resonant frequency K2/M3 is equal to one of the resonant frequencies of the system which is dependent upon the physical properties of the fluid 15 and the geometry of chamber 14. FIG. 7 shows a representation of the chamber 14 where the medium within is modeled by a mass 1 connected to the chamber walls by springs 2 which corresponds to the fundamental vibrational mode of the actual system.

Figure 8:
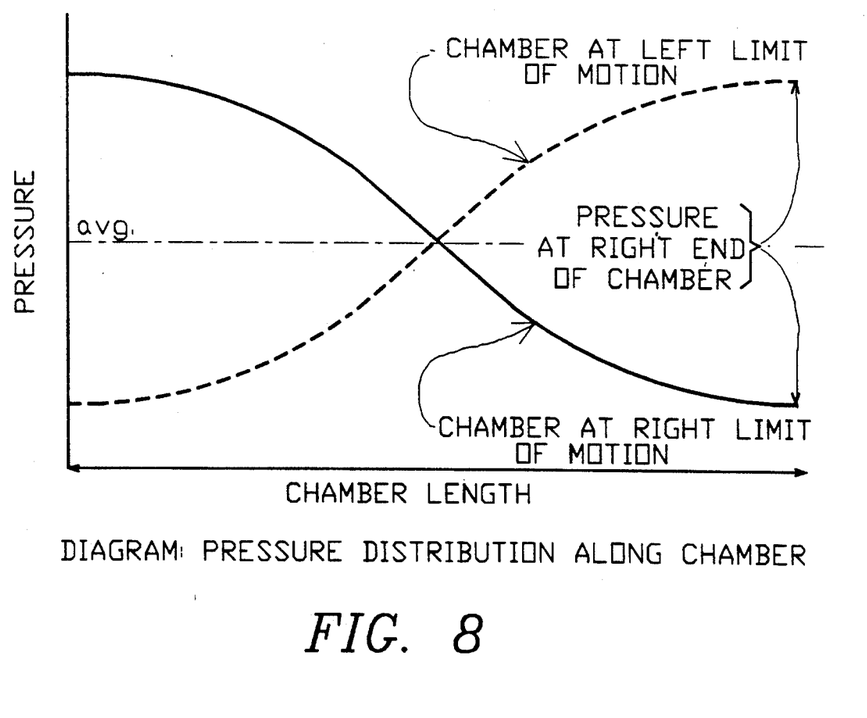
FIG. 8 is a graph of fluid pressure versus position along the length of the chamber for two cases corresponding to the limits of the chamber's vibratory motion.

FIG. 8 is a graph of fluid pressure versus position along the length of the chamber 14 for two cases corresponding to the limits of the chamber's vibratory motion. The broken curve illustrates the situation when the chamber has moved to the left while the solid curve shows the pressure distribution when the chamber has moved to the right. The result is a standing wave with a node in the middle and antinodes at both ends of the chamber. Other resonant modes are, of course, possible which also produce standing wave patterns when the chamber 14 is oscillated. The necessary condition is that the driving frequency corresponds to a wavelength $\lambda$ within the medium such that the chamber length equals $n\lambda/2$ where n is an odd integer. (Note that this is different from the compressors described in the '977 patent which use a single moving diaphragm. There, the chamber length must equal $n\lambda/4$ where n is an integer in order to produce resonance.)

By using the electromagnetic actuator to produce vibratory motion of the chamber containing the working fluid, it is possible to produce much greater pressures within the chamber than with a conventional single diaphragm. This is because the chamber may be displaced to a greater extent during its vibratory cycle than can a diaphragm. Furthermore, energy is applied to both ends of the chamber simultaneously since a rarefaction occurs at one end while a compression occurs at the other. Energy transfer is also made more efficient because the reaction forces produced by the actuator are not absorbed in the frame but in the chamber itself. Maximum vibratory displacement of the chamber, and therefore, maximum amplitude of the pressure waveform within, occurs when the resonant frequency of the armature 25 and leaf springs 10 combination equals a resonant frequency of the chamber 14 containing the medium.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. A vibratory compressor-actuator for pumping and compressing a working fluid medium in a unidirectional flow path including a rigid enclosed chamber having inlet and outlet means, the chamber having an axis of vibration along which the fluid medium contained therein may be vibrated at a selected frequency to produce a pressure standing wave, the compressor-actuator comprising:

a main actuator body solidly connected to the chamber in a manner to form and constitute therewith an actuator-chamber unit which behaves dynamically as a single mass, the acutator-chamber unit being supported in a resilient manner to render the unit vibratable along the axis; and an armature, spring-mounted within the main actuator body and cooperating therewith in a manner to be vibratable relative thereto along the axis in response to an alternating electrical drive current applied to said compressor-actuator and to thus produce a vibration of the actuator-chamber in reactive opposition to vibration of this armature;

the drive current to said compressor actuator being made to have a frequency selected to produce the pressure standing wave in the fluid medium within the chamber thus causing recurrent fluid pressure variations to pump and compress the fluid medium.

2. The compressor-actuator as set forth in claim 1 wherein said armature is mounted on a shaft with each end of the shaft mounted to a leaf spring at each end of said main actuator body.

3. The compressor-actuator as set forth in claim 1 wherein:

said armature comprises a permanent magnet structure magnetized in an axial direction, disposed within said main actuator body and mounted so as to have freedom of axial movement;

said main actuator body comprises a cylindrical outer casing constructed of material having high magnetic permeability, open at both ends along the axis of the shaft, said body further comprising a plurality of like adjacent field coils wound around a non-magnetic bobbin mounted coaxially within the casing, the magnetic structure being situated within the bobbin and having a plurality of axially separated magnetic poles each in close proximity to a corresponding one of the field coils; and the field coils are electrically connected so that adjacent coils produce opposing magnetic fields, and are energized by the drive current so as to cause reciprocating axial motion of said armature in accordance with the polarity of the current.

4. The compressor-actuator as set forth in claim 1 wherein:

said armature comprises a cylinder disposed coaxially within the main actuator body and mounted so as to have freedom of axial movement, and a plurality of like adjacent coils wound around the cylinder;

said main actuator body comprises a cylindrical outer casing constructed of material having high magnetic permeability, and a plurality of like annular permanent magnets mounted coaxially on the inner periphery of the casing and magnetized in a radial direction with each permanent magnet positioned in close proximity to a corresponding one of the coils; and the coils are electrically connected so that adjacent coils produce opposing magnetic fields, and are energized by the drive current so as to cause reciprocating motion of said armature in accordance with the polarity of the current.

5. The compressor-actuator as set forth in claim 1 wherein the armature is mounted within the actuator body by spring mounting means and further wherein the mass of the armature $M1$ and spring constant of the mounting means $K1$ are such that the resonant frequency at which the armature vibrates the square root of $K1/M1$ is equal to an acoustic resonant frequency of the chamber.

6. The compressor-actuator as set forth in claim 5 wherein the drive current is made to have a frequency substantially equal to the square root of $K1/M1$.

7. The compressor-actuator as set forth in claim 1 wherein said armature is mounted within said actuator body by spring mounting means and further wherein, with said armature having a mass $M1$ and the armature mounting means having a spring constant $K1$, the frequency of the drive current is made to substantially equal the square root of $K1/M1$ and wherein, the mass of the actuator-chamber unit being $M2$, and the fluid in the chamber having a dynamic mass $M3$ and spring constant $K2$, the standing wave amplitude in the fluid is maximized by making $K1/M1$ substantially equal to $(K2/M3)/(1+M1/M2)$.

8. A method of pumping and compressing a working fluid medium in a unidirectional flow path including a rigid enclosed chamber having inlet and outlet means, the chamber having an axis of vibration along which the fluid medium contained therein may be vibrated at a selected frequency to produce a pressures standing wave, comprising the steps of:

connecting a main actuator body of a compressor-actuator solidly to the chamber in a manner to form and constitute therewith an actuator-chamber unit which behaves dynamically as a single mass;

supporting the actuator-chamber unit in a resilient manner to make the unit vibratable along the axis;

spring-mounting an armature within the main actuator body in a manner to allow the armature to vibrate relative to the body along the axis, the body being made to cooperate electromagnetically with the armature in a manner to cause the armature and the body to vibrate in reactive opposition along the axis in response to an alternating electrical drive current applied to said compressor-actuator, and to thus produce vibration of the actuator-chamber unit along the axis; and applying the alternating electrical drive current to said compressor-actuator at a selected frequency such that the vibration of the actuator-chamber unit produces the pressure standing wave in the fluid medium within the chamber and thus causes oscillating fluid pressure variations to pump and compress the fluid medium.

* * * * *

UNITED STATES PATENT AND TRADEMARK OFFICE
CERTIFICATE OF CORRECTION

PATENT NO. : 5,231,337  
DATED : 07-27-1993  
INVENTOR(S) : Frederik T. Van Namen It is certified that error appears in the above-indentified patent and that said Letters Patent is hereby corrected as shown below:

On the title page, item (54) and column 1, title should read --Vibratory Compressor-Actuator--.

On the title page, item (75) inventor's address should read --Northridge, Calif.--.

Item [57] Abstract, Line 1, delete "An acoustic compressor" and insert --A vibratory compressor-actuator--. Line 3, delete "compressor" and insert --compressor-actuator--.

Column 1, line 43, between "characteristics" and "both", "o" should read --of--.

Column 1, line 16, after "medium", insert --by vibrating at least a portion of the chamber--.

Column 3, line 35, after, "the following equation holds:" insert the following formula:
$$K1/M1=(K2/M3)/(1+M1/M2)$$

Column 3, line 49, "Chamber" should read --A rigid chamber--.

Column 3, line 56, between "allow" and "fluid" insert --unidirectional flow, i.e."--.

Column 3, line 57, following "direction" insert --Typically valves 17 and 18 are connected to external fluid handling apparatus, not shown--,

UNITED STATES PATENT AND TRADEMARK OFFICE
CERTIFICATE OF CORRECTION

PATENT NO. : 5,231,337
DATED : 07-27-1993
INVENTOR(S) : Frederik T. Van Namen

It is certified that error appears in the above-indentified patent and that said Letters Patent is hereby corrected as shown below:

Column 3, line 57, "The waveform is generated by" should be deleted, and replaced with --The chamber 14 is vibrated as a whole along the central axis along with the solidly attached main body of--.

Column 3, line 62, delete "3 and 4" and insert --2 and 3--.

Column 7, line 19, "this" should read --said--.
Column 7, line 21, "frequency selected" should read --selected frequency--.

Column 8, line 13, insert a comma after "vibrates":
line 14, insert a comma after "K1/M1".

Signed and Sealed this

Twenty-second Day of March, 1994

Attest:

BRUCE LEHMAN

*Attesting Officer*  *Commissioner of Patents and Trademarks*